US006673235B2

(12) United States Patent
Harris et al.

(10) Patent No.: US 6,673,235 B2
(45) Date of Patent: Jan. 6, 2004

(54) FCC CATALYSTS FOR FEEDS CONTAINING NICKEL AND VANADIUM

(75) Inventors: David H. Harris, Mountainside, NJ (US); Mingting Xu, Edison, NJ (US); David Stockwell, Middlesex, NJ (US); Rostam J. Madon, Flemington, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/164,488

(22) Filed: Jun. 6, 2002

(65) Prior Publication Data

US 2003/0136707 A1 Jul. 24, 2003

Related U.S. Application Data

(63) Continuation-in-part of application No. 09/978,180, filed on Oct. 17, 2001, and a continuation-in-part of application No. 09/956,250, filed on Sep. 20, 2001, which is a continuation-in-part of application No. 09/667,677, filed on Sep. 22, 2000, now abandoned.

(51) Int. Cl.$^7$ ................................................ B01J 29/08
(52) U.S. Cl. .................... 208/120.01; 208/118; 502/64; 502/68; 502/65; 502/73; 502/79
(58) Field of Search .............................. 502/63, 64, 68, 502/65, 73, 79; 208/118, 120.01

(56) References Cited

U.S. PATENT DOCUMENTS

| 3,458,454 A | 7/1969 | Lapides et al. ............. 252/455 |
| 3,506,594 A | 4/1970 | Dzierzanowski et al. ... 252/455 |
| 3,533,962 A | 10/1970 | Cosgrove .................... 252/455 |
| 3,944,482 A | 3/1976 | Mitchell et al. ............ 208/120 |
| 4,493,902 A | 1/1985 | Brown et al. ................. 502/65 |
| 4,581,340 A | 4/1986 | Hinpsl et al. ................. 502/65 |
| 4,606,813 A | 8/1986 | Byrne et al. ................ 208/120 |
| 4,628,042 A | 12/1986 | Speronello .................. 502/263 |
| 4,631,262 A | 12/1986 | Altomare ..................... 502/65 |
| 4,716,136 A | * 12/1987 | Weisz et al. ................... 502/64 |
| 4,965,233 A | 10/1990 | Speronello .................. 502/65 |
| 5,023,220 A | 6/1991 | Dight et al. ................... 502/65 |
| 5,071,539 A | 12/1991 | Hayward et al. ........... 208/114 |
| 5,234,578 A | 8/1993 | Stine et al. ................. 208/113 |
| 5,243,121 A | 9/1993 | Madon et al. ............... 585/649 |
| 5,300,469 A | 4/1994 | Deeba et al. ................. 502/63 |
| 5,316,656 A | 5/1994 | Pellet et al. ................. 208/120 |
| 5,358,632 A | 10/1994 | Hedrick ....................... 208/163 |
| 5,384,041 A | 1/1995 | Deeba et al. ................ 203/253 |
| 5,395,809 A | 3/1995 | Madon et al. ................. 502/68 |
| 5,413,978 A | 5/1995 | Kramer ........................ 502/80 |
| 5,462,652 A | 10/1995 | Wegerer ..................... 208/167 |
| 5,521,133 A | 5/1996 | Koermer et al. ............... 502/9 |
| 5,559,067 A | 9/1996 | Lerner et al. ................. 502/68 |
| 5,662,868 A | 9/1997 | Letzsch et al. ............. 442/144 |
| 5,766,558 A | 6/1998 | Letzsch et al. ............. 422/144 |
| 5,976,355 A | 11/1999 | Johnson et al. ............. 208/119 |
| 5,993,645 A | 11/1999 | Madon et al. ............... 208/114 |
| 6,004,527 A | 12/1999 | Murrell et al. .............. 423/712 |
| 6,010,618 A | 1/2000 | Lomas ........................ 208/113 |
| 6,045,688 A | 4/2000 | Ruottu et al. ................ 208/113 |
| 6,063,263 A | 5/2000 | Palmas ....................... 208/113 |
| 2002/0115556 A1 | * 8/2002 | Stockwell et al. ............. 502/63 |
| 2003/0050181 A1 | * 3/2003 | Gibson et al. ................. 502/64 |
| 2003/0089640 A1 | * 5/2003 | Madon et al. ................. 502/64 |

FOREIGN PATENT DOCUMENTS

| GB | 1342977 | 1/1974 | ........... C01B/33/28 |
| WO | WO 02/24329 A2 | 9/2001 | |

OTHER PUBLICATIONS

D. M. Stockwell, "The Role of Porosity in the Cracking Selectivity of FCC Catalysts" Prepared for Presentation at the 3rd International Conference on Refinery Processing, Mar. 2000 AIChE Meeting, Copyright 1999, Engelhard Corporation, Unpublished.

* cited by examiner

Primary Examiner—M. Alexandra Elve
Assistant Examiner—Christina Ildebrando
(74) Attorney, Agent, or Firm—Raymond F. Keller

(57) ABSTRACT

A fluid catalytic cracking catalyst made from microspheres that initially contain kaolin, a dispersible boehmite alumina and a sodium silicate or silica sol binder. The kaolin portion contains hydrous kaolin and a particular kaolin which has been calcined through its characteristic exotherm and which produces a catalyst having a novel morphology comprising a macroporous matrix and crystallized zeolite freely coating the walls of the pores of the matrix. Calcination of the hydrous kaolin to metakaolin and formation of in-situ zeolite by treatment with sodium silicate yields a catalyst containing Y-faujasite and transforms the dispersible boehmite into a transitional alumina. The catalyst can be used to crack resid or resid-containing feeds as the alumina phase formed from the dispersible boehmite passivates nickel and vanadium contaminants.

80 Claims, 2 Drawing Sheets

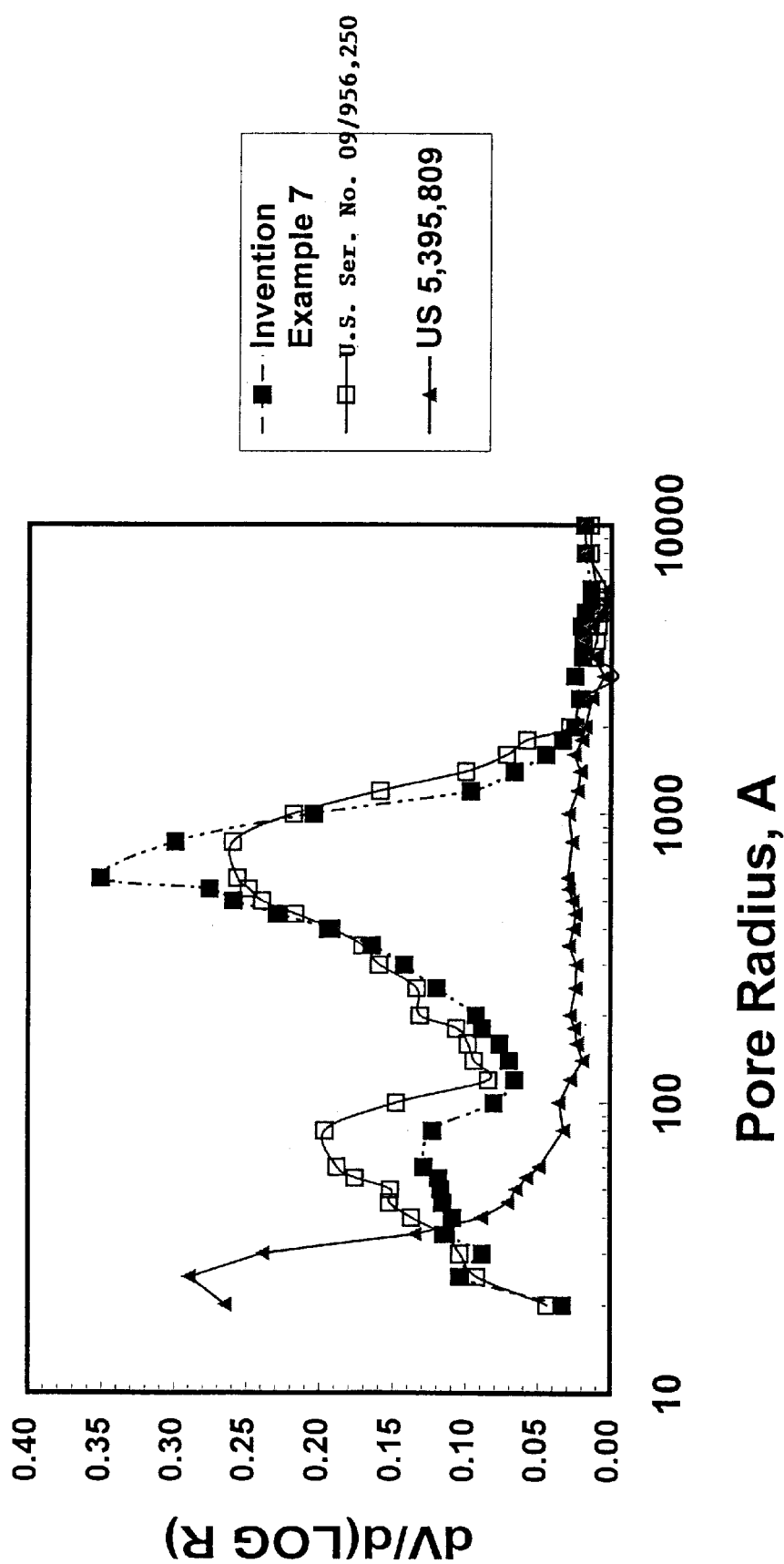

FCC CATALYSTS FOR FEEDS CONTAINING NICKEL AND VANADIUM

CROSS REFERENCE TO RELATED APPLICATIONS

This application is a continuation-in-part of U.S. Ser. No. 09/978,180, filed Oct. 17, 2001 and a continuation-in-part of U.S. Ser. No. 09/956,250, filed Sep. 20, 2001, which is a continuation-in-part of U.S. Ser. No. 09/667,677, filed Sep. 22, 2000 now abandoned.

FIELD OF THE INVENTION

This invention relates to catalysts useful for cracking heavy hydrocarbon feed stocks, such as resids, that contain high levels of nickel and vanadium contaminants. In particular, the invention is directed to improvements in zeolitic fluid cracking catalysts (FCC) produced by an in-situ reaction wherein preformed microspheres obtained by calcining microspheres composed of a mixture of hydrated kaolin, a dispersible boehmite alumina, binder, and kaolin clay calcined through its characteristic exotherm, undergo chemical reaction with sodium silicate solution to form crystals of zeolite and a porous silica/alumina matrix. The catalyst is metals tolerant, has good catalytic selectivity and is especially useful as a catalyst for cracking residuum (resid) and resid-containing feeds.

BACKGROUND OF THE INVENTION

Since the 1960's, most commercial fluid catalytic cracking catalysts have contained zeolites as an active component. Such catalysts have taken the form of small particles, called microspheres, containing both an active zeolite component and a non-zeolite component in the form of a high alumina, silica-alumina matrix. The non-zeolitic component or matrix is known to perform a number of important functions, relating to both the catalytic and physical properties of the catalyst. Oblad described those functions as follows:

"The matrix is said to act as a sink for sodium in the sieve thus adding stability to the zeolite particles in the matrix catalyst. The matrix serves the additional function of: diluting the zeolite; stabilizing it towards heat and steam and mechanical attrition; providing high porosity so that the zeolite can be used to its maximum capacity and regeneration can be made easy; and finally it provides the bulk properties that are important for heat transfer during regeneration and cracking and heat storage in large-scale catalytic cracking." A. G. Oblad Molecular Sieve Cracking Catalysts, The Oil And Gas Journal, 70, 84 (Mar. 27, 1972).

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

For many years a significant proportion of commercial FCC catalysts used throughout the world have been made by in-situ synthesis from precursor microspheres containing kaolin that had been calcined at different severities prior to formation into microspheres by spray drying.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50–70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin clay ($Al_2O_3:2SiO_2:2H_2O$) and powdered calcined kaolin clay that has undergone the exotherm together with a small amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this results in microspheres containing the desired mixture of metakaolin, kaolin calcined to undergo the exotherm and sodium silicate binder. In illustrative examples of the '902 patent, about equal weights of hydrated clay and spinel are present in the spray dryer feed and the resulting calcined microspheres contain somewhat more clay that has undergone the exotherm than metakaolin. The '902 patent teaches that the calcined microspheres comprise about 30–60% by weight metakaolin and about 40–70% by weight kaolin characterized through its characteristic exotherm. A less preferred method described in the patent, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology.

U.S. Pat. Nos. 5,023,220 and 5,395,809, assigned to the present assignee are further examples of patents which teach the formation of catalytic FCC microspheres from mixtures of hydrous kaolin, metakaolin and kaolin that has been calcined through the characteristic exotherm. These mentioned patents are herein incorporated by reference in their entirety.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst will have limited utility. Catalytic cracking activity in present day FCC catalysts is attributable to both the zeolite and non-zeolite (e.g., matrix) components. Zeolite cracking tends to be gasoline selective. Matrix cracking tends to be less gasoline selective. After appropriate ion-exchange treatments with rare earth cations, high zeolite content microspheres produced by the in situ procedure described in the '902 patent are both highly active and highly gasoline selective. As zeolite content of these unblended microspheres is increased, both activity and selectivity tend to increase. This may be explained by the decrease in matrix content with increase in zeolite content and the decreasingly prominent role of nonselective matrix cracking.

In recent years the oil refining industry has shifted to processing a larger quantity of resid due to the changing product slate and price structure of crude oil. Since the early 1980's many refiners have been processing at least a portion of residual oil as a feedback in their units and several now run a full residual oil cracking program. Processing resid can drastically alter yields of valuable roducts in a negative direction relative to a light feed.

Several factors are important to resid catalyst design. It is highly favorable if the catalyst can upgrade bottoms, minimize coke and gas formation, maximize catalyst stability, and minimize deleterious contaminant selectivity due to metal contaminants in resid feedstocks such as nickel and vanadium. While in-situ catalysts are commercially valuable, none of these in-situ catalysts possessed such a combination of properties when used to crack resid feedstocks.

Following the inception of catalytic cracking by Houdry in the early 1900's where an acid treated clay was used, the first revolution in the art of catalyst technology was the use of synthetic silica-alumina. The use of silica-alumina which had much more acidic Bronsted and Lewis acid sites increased the cracking activity and selectivity of the process over the clays. The second revolution came with the advent of zeolites and the discovery that they could be applied to cracking. The clear advantage of the zeolite was that the non-selective cracking to coke and gas was greatly reduced owing to the discrete pore structure of the crystalline zeolite and the shape selective chemistry which they provided. With the thrust in modern refining to limit the amount of coke and gas so as to maximize gasoline production the designed use of silica-alumina in cracking catalysts has decreased (see A. A. Avidan in: *Fluid Catalytic Cracking*: Science and Technology. Studies in Surface Science and Catalysis, Vol. 76. Magee, J. S. and Mitchell, M. M. Eds.; Elsevier, Amsterdam; 1993). The use of added aluminas has also found merit in helping to boost a catalyst's activity since pure aluminas also posses acidic sites. The relative activity of a catalyst is roughly proportional to the total quantity of acid sites present. Unfortunately alumina characteristically contains a large fraction of Lewis acid sites relative to Bronsted type sites. Lewis sites have been shown to be largely involved in the chemistry of hydride abstraction and coke formation (see Mizuno, et al. in Bulletin of the Chemical Society of Japan, Vol. 49, 1976, pp. 1788–1793).

Fluid cracking catalysts which contain silica-alumina or alumina matrices are termed catalysts with "active matrix". Catalysts of this type can be compared with those containing untreated clay or a large quantity of silica and which are termed "inactive matrix" catalysts. Work done by Otterstedt, et al. (Applied Catalysts, Vol. 38, 1988, pp. 143–155.) clearly shows the disadvantage of active matrices for coke and gas production sometimes producing twice as much as the inactive formulation.

Aluminas have long been used in hydrotreating and reforming catalyst technology (see P. Grange in Catalysis Reviews—Science and Engineering, Vol. 21, 1980, p. 135). Aluminas, and particularly transition aluminas, in addition to displaying acidic character also posses high surface areas typically on the order of several hundred meters squared per gram. They may be well suited for catalyst applications such as those mentioned where a metallic component is to be supported on the substrate surface (alumina in this case). The high surface area of the host material above allows for a more uniform, dispersed arrangement of the metal. This leads to smaller metal crystallites and helps to minimize metal agglomeration. Metal agglomeration or sintering is a leading cause of loss of activity since the activity for metal catalyzed reaction is proportional to the exposed metal surface area. When the metal "balls up" metallic surface area is lost and so is activity. In relation to catalytic cracking, despite the apparent disadvantage in selectivity, the inclusion of aluminas or silica-alumina has been beneficial in certain circumstances. For instance when processing a hydrotreated/demetallated vacuum gas oil (hydrotreated VGO) the penalty in non-selective cracking is offset by the benefit of cracking or "upgrading" the larger feed molecules which are initially too large to fit within the rigorous confines of the zeolite pores. Once "precracked" on the alumina or silica-alumina surface, the smaller molecules may then be selectively cracked further to gasoline material over the zeolite portion of the catalyst. While one would expect that this precracking scenario might be advantageous for resid feeds they are unfortunately characterized for the most part as being heavily contaminated with metals such as nickel and vanadium and to a lesser extent, iron. When a metal such as nickel deposits on a high surface area alumina such as those found in typical FCC catalysts, it is dispersed and participates as highly active centers for the catalytic reactions which result in the formation of contaminant coke (contaminant coke refers to the coke produced discretely from reactions catalyzed by contaminant metals). This additional cokes exceeds that which is acceptable by refiners.

Loss of activity or selectivity of the catalyst may also occur if the metal contaminants such as nickel, vanadium, from the hydrocarbon feedstock, deposit onto the catalyst. These metal contaminants are not removed by standard regeneration (burning) and contribute markedly to undesirably high levels of hydrogen, dry gas and coke and reduce significantly the amount of gasoline that can be made. Contaminant metal levels are particularly high in certain feedstocks, especially the more abundant heavier crudes. As oil supplies dwindle, successful economic refining of these heavier crudes becomes more urgent. In addition to reduced amounts of gasoline, these contaminant metals contribute to much shorter life cycles for the catalyst and an unbearably high load on the vapor recovery system. Deposited nickel and vanadium species have an intrinsic dehydrogenation activity which leads to the formation of coke and gas, two undesirable products. Furthermore, vanadium assists in destroying the crystallinity of the sieve. This leads to a loss of catalytic activity and to the formation of certain silica-alumina species which tend to promote the formation of coke and gas. The increased expense of refining metal-contaminated feedstocks due to the aforementioned factors lays a heavy economic burden on the refiner. Therefore, much effort has been spent in finding means to modify the catalyst or feedstock in such a way as to passivate the aforementioned undesirable effects of the metal contaminants.

Commonly assigned U.S. Pat. No. 5,559,067 addresses the problem of providing a resid FCC catalyst made by the in-situ route which can upgrade bottoms, minimize coke and gas formation, maximize catalyst stability and minimize deleterious contaminant selectivity due to contaminant metals. The resid FCC catalyst of the patent achieves metal tolerance in a manner considered to be relatively inexpensive to practice and does not result in the use of environmentally toxic additives such as the use of prior art technologies for achieving metals tolerance such as those involving the use of antimony. In accordance with the patent, microspheres comprising hydrous kaolin clay, gibbsite (alumina trihydrate), spinel, and a silica sol binder are prepared, the microspheres calcined to convert the hydrous kaolin component to metakaolin and the calcined microspheres reacted with an alkaline sodium solution into crystallized zeolite Y and ion exchanged.

During the conversion of hydrous kaolin to metakaolin, gibbsite also undergoes transformation to a transition alumina. Transition alumina may be defined as any alumina which is intermediate between the thermodynamically stable phases of gibbsite, bayerite, boehmite, and nordstandite on one end of the spectrum and alpha alumina or corrundum on the other. Such transition aluminas may be viewed as metastable phases. A scheme of the transformation sequence can be found in the text: *Oxides and Hydroxides of Aluminum* by K. Wefers and C. Misra; Alcoa Technical Paper No. 19, revised; copyright Aluminum Company of America Laboratories, 1987.

The activity and selectivity characteristics of the in-situ formed catalysts, such as formed by the process of the afore mentioned U.S. Pat. No. 4,493,902, are achieved even though, in general, the catalysts have relatively low total porosity as composed to fluid catalytic cracking catalysts prepared by incorporating the zeolite content into a matrix. In particular, the microspheres of such catalysts, in some cases, have a total porosity of less than about 0.15 cc/g. or even less than about 0.10 cc/g. In general, the microspheres of the '902 patent have a total porosity of less than 0.30 cc/g. As used herein, "total porosity" means the volume of pores having diameters in the range of 35–20,000 Å, as determined by the mercury porosimetry technique. The '902 patent noted that it was surprising that microspheres having a total porosity of less than about 0.15 cc/g. exhibit the activity and selectivity characteristics found. For example, such a result is contrary to the prior art disclosures that low pore volumes "can lead to selectivity losses due to diffusional restrictions."

It is believed that the relatively low porosity of the catalyst microspheres formed as in the '902 patent does not adversely effect activity and selectivity characteristics, since the microspheres of the '902 patent are not diffusion limited relative to the typical FCC processing conditions which were used at the time of the patent. In particular, catalyst contact time with the feed to be cracked was typically 5 seconds or more. Thus, while typical FCC catalysts formed by mechanically incorporating the zeolite within a matrix may have been more porous, the reaction time in prior art FCC risers did not yield any advantage in activity or selectivity. This result inspired the conclusion that transport processes were not at all limiting in FCC catalysts, at least outside the zeolite structure. Assertions made to the contrary were inconsistent with the facts and easily dismissed as self-serving. Importantly, the attrition resistance of the microspheres prepared in accordance with the '902 patent was superior to the conventional FCC catalysts in which the crystallized zeolite catalytic component was physically incorporated into the non-zeolitic matrix.

Recently, however, FCC apparatus have been developed which drastically reduce the contact time between the catalyst and the feed which is to be cracked. Conventionally, the reactor is a riser in which the catalyst and hydrocarbon feed enter at the bottom of the riser and are transported through the riser. The hot catalyst effects cracking of the hydrocarbon during the passage through the riser and upon discharge from the riser, the cracked products are separated from the catalyst. The catalyst is then delivered to a regenerator where the coke is removed, thereby cleaning the catalyst and at the same time providing the necessary heat for the catalyst in the riser reactor. The newer riser reactors operate at lower residence time and higher operating temperatures to minimize coke selectivity and delta coke. Several of the designs do not even employ a riser, further reducing contact time to below one second. Gasoline and dry gas selectivity can improve as a result of the hardware changes. These FCC unit modifications are marketed as valuable independent of the type of catalyst purchased, implying an absence of systematic problems in state of the art catalyst technology.

The processing of increasingly heavier feeds in FCC type processes and the tendency of such feeds to elevate coke production and yield undesirable products have also led to new methods of contacting the feeds with catalyst. The methods of contacting FCC catalyst for very short contact periods have been of particular interest. Thus, short contact times of less than 3 seconds in the riser, and ultra short contact times of 1 second or less have shown improvements in selectivity to gasoline while decreasing coke and dry gas production.

To compensate for the continuing decline in catalyst to oil contact time in FCC processing, the "equilibrium" catalysts in use have tended to become more active. Thus, increases in the total surface area of the catalyst need to be achieved and as well, the level of rare earth oxide promoters added to the catalysts are increasing. Moreover, cracking temperatures are rising to compensate for the reduction in conversion. Unfortunately, it has been found that the API gravity of the bottoms formed during short contact time (SCT) often increases after a unit revamp, leading some to suggest that the heaviest portion of the hydrocarbon feed takes longer to crack. Further, while a high total surface area of the catalyst is valued, the FCC process still values attrition resistance. Accordingly, while not obvious to those participating in the art, it has become increasingly likely that an optimization of FCC catalysts for the new short contact time and ultra short contact time processing which is presently being used is needed.

It is now theorized, that under the short contact time processing of hydrocarbons, that further improvements can be gained by eliminating diffusion limitations that may still exist in current catalysts. This is being concluded even as these materials excel at the application. It is theorized that improvements in these catalysts may be produced by optimization of catalyst porosity and the elimination of active site occlusion and diffusional restrictions of the binder phases present in catalysts prepared by the so-called incorporation method.

While the present assignee has produced zeolite microspheres with increased zeolite content and increased activity by increasing the macroporosity of the spray dried microsphere zeolite precursors, the porosity of the formed zeolite microsphere catalysts has not before been considered a problem since there has been found no diffusion limitation under the previous FCC processing techniques. For example, commonly assigned, U.S. Pat. No. 4,965,233, to Speronello discloses increasing the zeolite content of an in-situ catalyst by forming highly porous precursor microspheres, which allow increased amounts of zeolite to grow within the porous matrix. The highly porous precursor microspheres are formed by spray drying a slurry of hydrous kaolin clay, which is characterized by the presence of a major amount of large (greater than 2 microns) kaolin stacks along with spinel calcined clay. When spray dried, the coarse hydrous kaolin results in microspheres having a desired high content of macropores in which the zeolite Y can grow. Likewise, commonly assigned, U.S. Pat. No. 5,023,220, to Dight, et. al. also increases the macroporosity of the precursor microspheres by spray drying a mixture of hydrous clay, metakaolin and spinel. These catalyst microspheres have a substantial level of zeolite and are very active and selective. Further, the high alumina, silica-alumina matrix portion of the catalysts is often totally surrounded by the zeolite formed in-situ such that the matrix is only now understood to provide a reduced level of bottoms cracking under the short contact time FCC conditions.

SUMMARY OF THE INVENTION

A novel, high pore volume in-situ fluid cracking catalyst is provided which is useful in cracking feeds that contain nickel and vanadium. The FCC catalyst of this invention is made from microspheres, which initially contain kaolin, binder, and a matrix derived from a dispersible boehmite alumina and an ultra fine hyrdrous kaolin having a particulate size such that 90 Wt % of the hydrous kaolin particle are less than 2 microns, and which is pulverized and calcined through the exotherm. The microsphere is subsequently converted using standard in-situ Y zeolite growing procedures to make a Y-containing catalyst. Exchanges with ammonium and rare earth cations with appropriate calcinations provides an FCC catalyst that contains a transitional alumina obtained from the boehmite and a catalyst of a unique morphology to achieve effective conversion of hydrocarbon to cracked gasoline products with improved bottoms cracking under SCT FCC processing.

Preparation of the novel fluid cracking catalyst, in accordance with an aspect of this invention, involves an initial step of preparing microspheres comprising hydrous kaolin and/or metakaolin, a dispersible boehmite ($Al_2O_3$, $H_2O$), kaolin calcined through its characteristic exotherm and derived from ultra fine hyrdrous kaolin, and a binder. The microspheres are calcined to convert any hydrous kaolin component to metakaolin. The calcination process transforms the dispersible boehmite into a transitional alumina phase. The calcined microspheres are reacted with an alkaline sodium silicate solution to crystallize zeolite Y and ion-exchanged. The transitional alumina phase that results from the dispersible boehmite during the preparative procedure and which forms the matrix of the final catalyst, passivates the Ni and V that are deposited on to the catalyst during the cracking process, especially during cracking of heavy residuum feeds. This results in a substantial reduction in contaminant coke and hydrogen yields. Contaminant coke and hydrogen arise due to the presence of Ni and V and reduction of these byproducts significantly improves FCC operation.

The morphology of the microsphere catalysts, which are formed, is unique relative to the in-situ microsphere catalysts formed previously. Use of a pulverized, ultrafine hydrous kaolin calcined through the exotherm to form a portion of the matrix yields in-situ zeolite microspheres having a macroporous structure in which the macropores of the structure are essentially coated or lined with zeolite subsequent to crystallization. Microsphere catalysts of this morphology are disclosed in commonly assigned U.S. Ser. Nos. 09/667,677 filed Sep. 22, 2000 and U.S. Ser. No. 09/956,250, filed Sep. 20, 2001. Macroporosity as defined herein means the catalyst has a macropore volume in the pore range of 600–20,000 Å of at least 0.07 cc/gm mercury intrusion. The novel catalyst of this invention is optimal for FCC processing; including the short contact time processing in which the hydrocarbon feed is contacted with a catalyst for times of about 3 seconds or less. The macroporosity reduces the catalytic coke formed during short contact time processing, and improves the yields of primary cracked products.

More generally, the FCC catalyst matrix useful in this invention to achieve FCC catalyst macroporosity is derived at least in part from alumina sources, such as kaolin calcined through the exotherm, that have a specified water pore volume, which distinguishes over prior art calcined kaolin used to form the catalyst matrix. The water pore volume is derived from an Incipient Slurry Point (ISP) test, which is described below.

In the broadest sense, the invention is not restricted to macroporous catalysts having a non-zeolite matrix derived in part from ultrafine kaolin. Thus, any alumina source, which has the proper combinations of porosity and reactivity during zeolite synthesis and can generate the desired catalyst macroporosity and morphology, can be used. The desired morphology comprises a matrix which is well dispersed throughout the catalyst, and the macropore walls of matrix are lined with zeolite and are substantially free of binder coatings. Accordingly, not only is the large pore surface area of the catalyst vastly improved over previous catalysts, and the active matrix dispersed throughout the microsphere, the zeolite crystals are readily accessible to the hydrocarbon feed. While not wishing to be bound by any theory of operation, it appears that previous catalysts in which the zeolite is incorporated into a matrix by physical mixing and glued with binder have sufficient macroporosity, however the binder coats the active zeolite catalyst thereby blocking accessibility thereto. The present microsphere catalysts have a morphology which allows fast diffusion into the catalyst due to the macroporosity and enhanced dispersion of the matrix, and further provides the highest accessibility to the zeolite inasmuch as the zeolite is freely coated onto the walls of the pores. The term "freely" means that the zeolite phase is present on the surface of the matrix and is unobstructed by any binder phases. Merely having macroporosity does not provide the results we have obtained, since conventional incorporated catalysts have similar macroporosity. It is therefore the combination of porosity and zeolite-coated macropore walls that give the surprising selectivity results.

BRIEF DESCRIPTION OF THE DRAWINGS

FIG. 2 is a graph comparing the mercury pore volume of the cracking catalysts of the present invention and control catalysts.

DETAILED DESCRIPTION OF THE INVENTION

Figure 1:
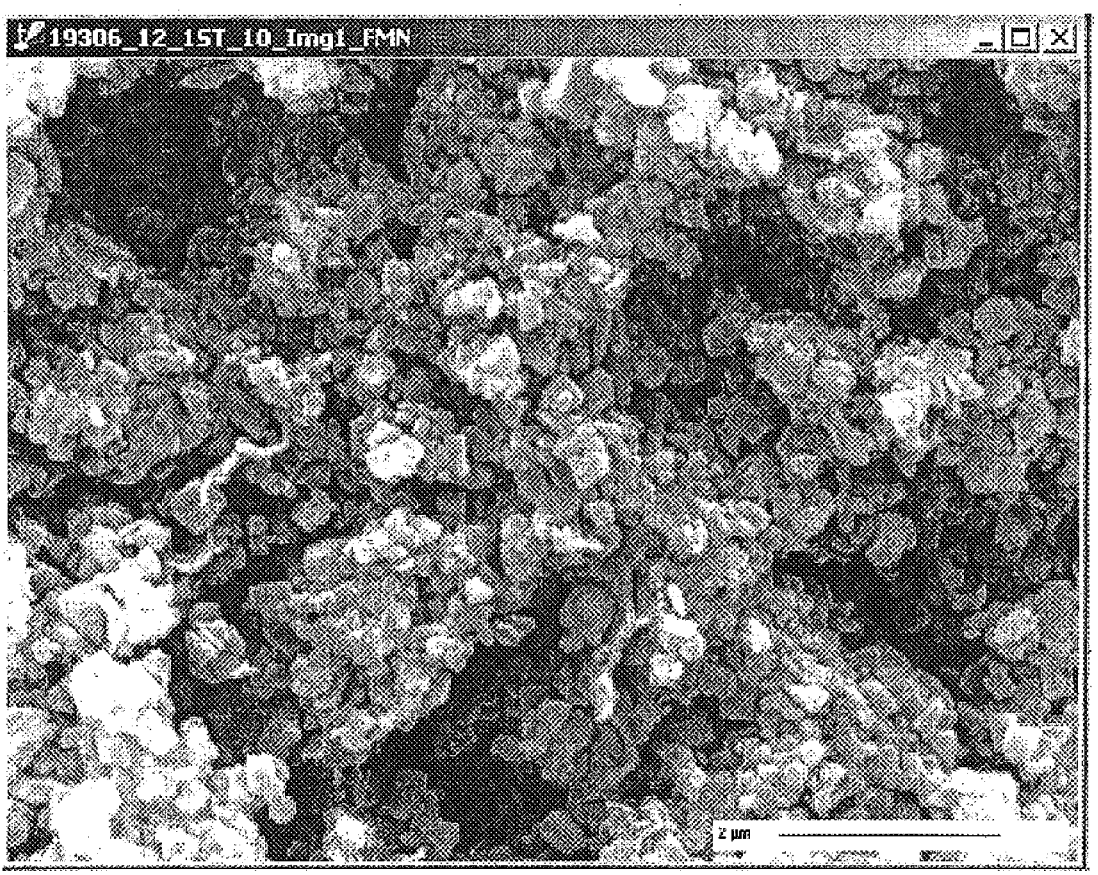
FIG. 1 is an SEM Photograph of a zeolite microsphere of the present invention.

Catalysts of the invention are made by spray drying a feed mixture of hydrated kaolin, boehmite alumina, a kaolin calcined through the exotherm, and a binder such as silica sol or sodium silicate. The spray-dried microspheres are optionally acid-neutralized and washed to reduce sodium content, but subsequently are calcined to form precursor porous microspheres in which any of the hydrous kaolin is converted to metakaolin. It is preferred that calcination be conducted at temperatures below that which would cause any kaolin present to undergo the characteristic kaolin exothermic reaction to spinel or mullite. The spinel or mullite formed from the kaolin calcined through the exotherm along with the boehmite will form the non-zeolite matrix of the catalyst. The addition of spinel or mullite to the microsphere results in an FCC catalyst that contains multiple matrix components; i.e., the alumina and the spinel or mullite. The spinel is useful for improving the upgrading of the heaviest fraction, in a feed, referred to as bottoms. The ratio of alumina to spinel or mullite is important, since as this ratio decreases, there is less effective passivation on Ni and V. On the other hand, the spinel or mullite is derived from ultra fine kaolin or other alumina source, which provides the needed catalyst macroporosity, and such material or its equivalent needs to be provided in amounts to achieve the described macroporosity and subsequently reduced catalytic coke.

Any binder used should contain only sodium, expressed as $Na_2O$, which is easily removed. Although the silica or silicate binders traditionally used do bring these nutrients into the zeolite crystallization process, their main purpose is to provide mechanical strength to the green microspheres sufficient to withstand processing up until crystallization. Therefore, any binder capable of fulfilling this role while not interfering with the other constraints laid out herein would be adequate. Aluminum chlorohydrol for example might be useful.

The precursor microspheres are reacted with zeolite seeds and an alkaline sodium silicate solution, substantially as described in U.S. Pat. No. 5,395,809, the teachings of which are incorporated herein by cross-reference. The microspheres are crystallized to a desired zeolite content (typically ca. 50–65%), filtered, washed, ammonium exchanged, exchanged with rare-earth cations if required, calcined, exchanged a second time with ammonium ions, and calcined a second time if required.

Especially preferred compositions of the solids in the slurries that are spray dried to form porous microspheres, and later calcined to prepare precursor microspheres, are expressed hereinafter below in table form as the weight percent of hydrated kaolin, boehmite and kaolin calcined through the exotherm (spinel or mullite) on a binder-free basis; weight % $SiO_2$ binder is based on the grams of SiO2 in the binder per gram of total weight of moisture-free spray dried microspheres and provided by sodium silicate.

| Ingredients | Broad | Most Preferred | Preferred |
|---|---|---|---|
| Hydrated Kaolin | 0–50 | 30–45 | 15–50 |
| Metakaolin | 0–50 | 0–10 | 0–30 |
| Boehmite Alumina | 5–50 | 15–30 | 10–40 |
| Kaolin calcined through the exotherm | 30–85 | 32–42 | 30–70 |
| Binder | 2–35 | 5–15 | 4–25 |

The reactive kaolin of the slurry to form the microspheres can be formed of hydrated kaolin or calcined hydrous kaolin (metakaolin) or mixtures thereof. The hydrous kaolin of the feed slurry can suitably be either one or a mixture of ASP® 600 or ASPO 400 kaolin, derived from coarse white kaolin crudes. Finer particle size hydrous kaolins can also be used, including those derived from gray clay deposits, such as LHT pigment. Purified water-processed kaolin clays from Middle Georgia have been used with success. Calcined products of these hydrous kaolins can be used as the metakaolin component of the feed slurry.

Silicate for the binder is preferably provided by sodium silicates with $SiO_2$ to $Na_2O$ ratios of from 1.5 to 3.5 and especially preferred ratios of from 2.00 to 3.22.

Importantly, the non-zeolitic, alumina-rich matrix of the catalysts of the present invention is derived at least in part from a hydrous kaolin source that is in the form of an ultrafine powder in which at least 90 wt. % of the particles are less than 2.0 microns, preferably at least 90 wt. % less than 1 micron. The ultrafine hydrous kaolin is pulverized and calcined through the exotherm. Typical zeolite microspheres have been formed with an alumina-rich matrix derived from kaolin having a larger size than used in this invention and which is calcined at least substantially through its characteristic exotherm. Satintone® No. 1, (a commercially available kaolin that has been calcined through its characteristic exotherm without any substantial formation of mullite) is a material used initially on a commercial basis to form the alumina-rich matrix. Satintone® No. 1 is derived from a hydrous kaolin in which 70% of the particles are less than 2 microns. Other sources used to form the alumina-rich matrix include finely divided hydrous kaolin (e.g., ASP® 600, a commercially available hydrous kaolin described in Engelhard Technical Bulletin No. TI-1004, entitled "Aluminum Silicate Pigments" (EC-1167)) calcined at least substantially through its characteristic exotherm. Booklet clay has found the most widespread commercial use and has met tremendous success worldwide. Before the invention disclosed in previously mentioned U.S. Ser. Nos. 09/667,677 and 09/956,250, these larger clay particles represented the state of the art in forming the alumina-rich matrix of the catalyst microsphere and had no perceived deficits.

What is meant by "ultrafine" powder is that at least 90 wt. % of the hydrous kaolin particles must be less than 2 microns in diameter, preferably less than 1 micron determined by Sedigraph™ (or sedimentation). It has been found that, in particular, use of hydrous kaolin pigments with this particle size distribution upon pulverization and calcination through the characteristic exotherm results in a greater quantity of macroporosity even in the catalyst microsphere subsequent to zeolite crystallization. The loose packing of the calcined ultrafine kaolin, which has been found, can be likened to a "house of cards" in which the individual particulates are aligned randomly with respect to adjacent particles in a non-parallel manner. Moreover, the calcined ultrafine kaolin exists as porous aggregates of the "house of cards" morphology, providing not only a porous aggregate but additional porous areas between aggregates. Pulverization of the ultrafine hydrous kaolin is required to provide the random stacking of the individual kaolin platelets.

Kaolin clays or pigments are naturally-occurring hydrated aluminum silicates of the approximate formula $Al_2O_3.2SiO_2.XH_2O$, wherein X is usually 2. Kaolinite, nacrite, dickite and halloysite are species of minerals in the kaolin group. It is well-known that when kaolin is heated in air, that a first transition occurs at about 550° C. associated with an endothermic dehydroxylation reaction. The resulting material is generally referred to as metakaolin. Metakaolin persists until the material is heated to about 975° C. and begins to undergo an exothermic reaction. This material is frequently described as kaolin, which has undergone the characteristic exothermic reaction. Some authorities refer to this material as a defect aluminum-silicon spinel or as a gamma alumina phase. See Donald W. Breck, *Zeolite Molecular Sieves*, published by John Wiley and Sons, 1974, pp. 314–315. On further heating to about 1,050° C., high temperature phases including mullite begin to form. The extent of conversion to mullite is dependent on a time-temperature relationship and the presence of mineralizers, as is well-known in the art.

In the preferred embodiments of this invention, the pulverized ultrafine hydrous kaolin, used to derive the corresponding portion of the alumina-rich matrix, is calcined through its characteristic exotherm with or without the formation of mullite. An especially preferred matrix source which is used in this invention to form the macroporous zeolite microspheres is Ansilex® 93. Ansilex® 93 is made from the fine size fraction of a hard kaolin crude, by spray drying, pulverizing and calcining to prepare low abrasion pigments as described in U.S. Pat. No. 3,586,523, to Fanselow, et. al., the entire contents of which are herein incorporated by reference. The ultrafine hydrous matrix source is spray dried, pulverized and then calcined through the exotherm, optionally to mullite. The aforementioned U.S. Pat. No. 4,493,902 discloses calcining the kaolin clay to mullite until the X-ray diffraction intensities are comparable to a fully crystalline reference standard. While it is within the scope of the present invention to calcine the kaolin beyond the exotherm such that the X-ray diffraction intensities are comparable to a fully crystalline referenced standard as disclosed in the '902 patent, it is preferred to calcine the kaolin beyond the characteristic exotherm so as to convert the kaolin to small crystallite size mullite. The small crystallite size mullite has the appropriate diffraction lines and leached chemical composition of a fully crystalline mullite standard, but the diffractional lines are weaker inasmuch as the crystallites are smaller. The relationship between diffraction intensity/line width and crystallite size is well-known. It is preferred to calcine the kaolin beyond the exotherm to a small crystallite mullite matrix inasmuch as fully calcining the kaolin to mullite takes excessive time and temperature in practice. Furthermore, calcining kaolin beyond the exotherm to fully crystalline mullite can result in the macroporosity being lost due to sintering. Moreover, the ISP and bulk density after calcining kaolin to fully crystalline mullite can be substantially increased. Thus, it is preferred that the ultrafine kaolin calcined through the exotherm has 20–80% of the integrated X-ray diffraction peak areas of a kaolin reference sample containing well crystallized mullite. More preferably, the ultrafine kaolin is calcined through the exotherm such that it has 50–70% of the integrated X-ray diffraction peak areas of fully crystallized mullite.

What is unusual about the use of the Ansilex® material is that it is derived from hard kaolin clay. Hard kaolin clays typically have a gray tinge or coloration and are, thus, also referred to as "gray clays". These hard kaolins are further characterized by breaking into irregularly shaped fragments having rough surfaces. Hard kaolin clays also contain a significant iron content, typically about 0.6 to 1 wt. % of $Fe_2O_3$. Hard kaolin clays are described in Grim's "Applied Clay Mineralogy", 1962, MaGraw Hill Book Company, pp. 394–398 thereof, the disclosure of which is incorporated by reference herein. The use of these materials to form part of the alumina-rich matrix for in situ FCC microsphere catalysts has not been known previous to U.S. Ser. Nos. 09/667,677 and 09/956,250 although their use in the incorporated routes is well established. Hard kaolin clays have also occasionally been used as sources of metakaolin for in situ microspheres, but not with advantage. Without wishing to be bound by any theory, it would appear that previous use of the calcined gray clays in the in situ matrix art would be precluded by (a) the high iron content thereof and the possibility that this could lead to coke and gas production, and (b) the dilatant nature of slurries formed therefrom, leading to apparently senseless waste of process time and increased cost in making down high viscosity slurries which spray dry at low solids. We now believe these dilatancy problems and porosity benefits are intrinsically and fundamentally linked. As for the former point, reduced coke and gas was an especially sought-after object for in situ catalysts, since the original formulations of Haden made coke and gas commensurate with their extraordinarily high level of amorphous matrix activity. This led to lower and lower levels of iron and spinel in subsequent inventions. It is a surprising finding that there appears to be no relationship between the iron and coke and gas selectivities after all. Instead, substantial improvements in FCC dry gas and coke were obtained through process modifications like improved feed injection and riser termination devices reducing contact time.

The alumina-rich matrix can be derived at least in part from alumina-containing materials more generally characterized by the porosity thereof provided during the packing of the calcined material. A test has been developed to determine the pore volume of the calcined alumina-containing material which ultimately forms the matrix of the inventive catalyst. The test characterizes the water pore volume of the calcined alumina-containing material by determining the minimum amount of water needed to make a slurry from a sample of the solids. In the test, a powder sample is mixed with water containing a dispersant such as, for example, Colloid 211, Viking Industries, Atlanta, Ga., in a cup using a stirring rod or spatula. Just enough water is added to the dry sample to convert the dry powder to a single mass of dilatant mud which only just begins to flow under its own weight. The incipient slurry point (ISP) is calculated from the weights of the sample and water used. The incipient slurry point can be calculated as follows: ISP=[(grams of dry sample)/(grams of dry sample plus grams of water added)]× 100. The units are dimensionless and are reported as percent solids.

This amount of water is larger than the (internal) water pore volume of the sample, but is clearly related to the water pore volume. Lower incipient slurry point percent solids values indicate higher water absorption capacities or higher pore volume in the sample. The calcined alumina-containing materials from which the high-alumina matrix is derived in accordance with this invention will have incipient slurry points less than 57% solids, preferably 48 to 52% solids.

This compares with Satintone® No. 1 which yields over 58% solids in the incipient slurry point test.

Accordingly, not only is the ultrafine hydrous kaolin useful as an alumina-containing material from which to derive the matrix of the catalyst microspheres, but the matrix may also be derived from delaminated kaolin, platelet alumina and precipitated alumina. Means for delaminating booklets or stacks of kaolin are well-known in the art. Preferred are those methods, which use a particulate grinding medium such as sand, or glass microballoons as is well-known. Subsequent to delamination, the platelets are pulverized to derive the random packing or "house of cards" morphology.

An advantage of the matrix precursors meeting the ISP test specification is that they bring higher pore volume per unit matrix surface area. This maximizes the effectiveness iii of the catalyst by minimizing both catalytic coke (pore volume) and contaminant coke (matrix surface area).

The pulverize-calcine-pulverize processing of hydrous kaolin is preferred to make the matrix precursor of the invention because it appears that, when the foregoing is used with hydrous kaolin as the metakaolin source to form the reactive precursor microspheres, superior attrition resistance results at high pore volume. While less preferred, matrix precursors may also be wet milled to further de-agglomerate the precursor. The milling appears to reduce microsphere pore volume, all other things held constant. A method to reduce microsphere pore volume is useful when pre-calcined metakaolin powder is used to form the reactive precursor microspheres. Dight has disclosed that employing metakaolin powder increases precursor microsphere pore volume, but excessive levels of zeolite and surface area can be required to make these microspheres acceptably attrition resistant. While helping to moderate the required zeolite content and also perhaps improving the dispersion of said milled matrix in the microsphere, the de-agglomeration appears to have the effect of breaking strong bonds which could have otherwise strengthened the final catalyst, and so is not preferred.

It is also within the scope of this invention to derive the matrix from chemically synthesized spinel and/or mullite. Thus, Okata, et al., "Characterization of spinel phase from $SiO_2$—$Al_2O_3$ xerogels and the formation process of mullite", Journal of the American Ceramic Society, 69 [9] 652–656 (1986), the entire contents of which are incorporated herein by reference disclose that two kinds of xerogels can be prepared by slow and rapid hydrolysis of tetraethyoxy silane and aluminum nitrate nonahydrdate dissolved in ethanol. The slow hydrolysis method involves gelling the above mixture in an oven at 60° C. for one to two weeks whereas the rapid hydrolysis method involves adding ammonium hydroxide solution to the mixture and drying in air. Xerogels prepared by the slow hydrolysis method crystallized mullite directly from the amorphous state on firing whereas the xerogels formed by rapid hydrolysis crystallized a spinel phase before mullite formation. As long as such calcined synthetic materials have a water pore volume within the scope of this invention, such materials can be used to derive the high-alumina matrix of the catalyst of this invention.

Preferably, the pore volume of the crystallized zeolite microsphere of this invention, which is formed using the high water pore volume alumina-containing materials as determined by the ISP test to form the catalyst matrix, is greater than 0.15 cc/gm, more preferably greater than 0.25 cc/gm, and most preferably greater than 0.30 cc/gm of Hg in the range of 40–20,000 Å diameter. More particularly, the catalyst of this invention has a macropore volume within pores having a size range of 600 to 20,000 Å of at least 0.07 cc/gm of Hg, and preferably at least 0.10 cc/gm of Hg. While conventional zeolite-incorporated catalysts have macroporosities comparable to the catalysts of this invention, the incorporated catalysts do not have the novel zeolite-on-matrix morphology nor performance of the catalysts of this invention. The catalysts of this invention will have a BET surface area less than 500 $m^2/g$, preferably less than 475 $m^2/g$ and most preferably within a range of about 300–450 $m^2/g$. The moderate surface area of the catalysts of this invention in combination with the macroporosity achieves the desired activity and selectivities to gasoline while reducing gas and coke yields.

One skilled in the art will readily appreciate that it is the steam-aged surface area and activity that is truly significant and which must be balanced against the available pore volume. The cited preferred surface areas for finished product (fresh) catalyst are chosen such that the surface area after a 1500° F., four hour steaming at 1 atm steam pressure are generally below 300 m2/gm.

It has further been found that the macroporosity of the catalyst of this invention is maintained even though a portion of the matrix is derived from boehmite and, optionally, additional coarse alumina-containing materials which otherwise do not meet the water pore volume desired by this invention as determined by the ISP test. Thus, it was found that blends of booklet clay and ultrafine kaolin that are calcined through the exotherm produce catalysts with high pore volume, wide macropores but with a lower zeolite content. Such catalysts can be valuable for exceptionally severe cracking environments.

In order to passivate contaminant metals, such as nickel and vanadium, the catalyst matrix further includes an alumina source derived from highly dispersible boehmite. Other aluminas such as pseudo-boehmite with low Wdispersibility, and gibbsite are not as effective. Dispersibility of the hydrated alumina is the property of the alumina to disperse effectively in an acidic media such as formic acid of pH less than about 3.5. Such acid treatment is known as peptizing the alumina. High dispersion is when 90% or more of the alumina disperses into particles less than about 1 micron. When this dispersed alumina solution is spray dried with the kaolin and binder, the resulting microsphere contains uniformly distributed alumina throughout the microsphere.

The surface area (BET, nitrogen) of the crystalline boehmite (as well as the gamma-delta alumina conversion product) is below 150 $m^2/g$, preferably below 125 $m^2/g$, and most preferably below 100 $m^2/g$, e.g. 30–80 $m^2/g$.

Following are typical properties of fully peptizable and dispersible crystalline boehmites which can be used in practice of the invention.

| | | |
|---|---|---|
| $Al_2O_3$ | wt % | 99.0 min. (ignited) |
| Carbon | " | 0.5 max. |
| $SiO_2$ | " | 0.015 max. |
| $Fe_2O_3$ | " | 0.015 max. |
| $Na_2O$ | " | 0.005 max. |
| Surface Area ($m^2/g$) | | (before calcination) 30–80 |
| Pore volume, cc/g | | 70% in pores having radii from 100 to 1,000 Å units |
| Total volatiles | | ~20 wt. % max. |
| Pore size diameter | | 150–1,000 Å |

Monoprotic acids, preferably formic, can be used to peptize the crystalline boehmite. Other acids that can be employed to peptize the alumina are nitric and acetic.

During production, spray dried microspheres containing crystalline boehmite in the matrix are calcined. As a result of calcination, the crystalline boehmite is converted to a porous gamma phase and to a lesser extent a delta alumina. The BET surface area of this material only increases marginally, e.g., increases from 80 m²/g to 100 m²/g.

In a preferred embodiment of the invention, an aqueous slurry of finely divided hydrated kaolin, kaolin that has been calcined through its characteristic exotherm, boehmite and binder is prepared. More preferably, the finely divided boehmite alumina peptized with formic acid at pH 2.7 to 3.2 is slurried in water and is added separately to the aqueous slurry of hydrous kaolin and binder. Thus, the hydrous kaolin, calcined kaolin and binder are premixed in one tank and fed to the spray drier from one line, and the aqueous alumina slurry, peptized such as with formic acid is introduced from a separate line immediately prior to when the whole mix enters the spray drier. Other mixing and injection protocols may also be useful. The final slurry solids are about 30–50 wt. %. The aqueous slurry is then spray dried to obtain microspheres comprising a silica bonded mixture of hydrated kaolin, boehmite and kaolin that has been calcined at least substantially through its characteristic exotherm (spinel or mullite). Preferably, a moderate amount of sodium silicate is added to the aqueous slurry before it is spray dried. During and after spray drying, the sodium silicate functions as a binder in place between the kaolin particles. The microspheres have average particle diameters that are typical of commercial fluid catalytic cracking catalysts, e.g., 65–85 microns. Suitable spray drying conditions are set forth in the '902 patent.

A quantity (e.g., 3 to 30% by weight of the kaolin) of zeolite initiator may also be added to the aqueous slurry before it is spray dried. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds". The zeolite initiator may or may not exhibit detectable crystallinity by x-ray diffraction.

Adding zeolite initiator to the aqueous slurry of kaolin before it is spray dried into microspheres is referred to herein as "internal seeding". Alternatively, zeolite initiator may be mixed with the kaolin microspheres after they are formed and before the commencement of the crystallization process, a technique which is referred to herein as "external seeding".

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Especially preferred seeds are disclosed in U.S. Pat. No. 4,631,262.

After spray drying, the microspheres are calcined at a temperature and for a time (e.g., for two to four hours in a muffle furnace at a chamber temperature of about 1300°–1550° F.) sufficient to convert the hydrated kaolin component of the microspheres to metakaolin, leaving the spinel component of the microspheres essentially unchanged. Alternatively, if the microspheres are formed with a sodium silicate binder the microspheres may be acid-neutralized to enhance ion exchange of the catalysts after crystallization. The acid-neutralization process comprises co-feeding uncalcined, spray dried microspheres and mineral acid to a stirred slurry at controlled pH. The rates of addition of solids and acid are adjusted to maintain a pH of about 2 to 7, most preferably from about 2.5 to 4.5 with a target of about 3 pH. The sodium silicate binder is gelled to silica and a soluble sodium salt, which is subsequently filtered and washed free from the microspheres. The silica gel-bound microspheres are then calcined. As a further alternative, if a colloidal silica or silica alumina binder is used which contains a sodium sulfate or equivalent salt coproduct, the microspheres should be washed to remove the salt before calcination. Most preferably the calcined microspheres comprise about 27 to 42% by weight metakaolin, about 33 to 44% by weight kaolin calcined through the exotherm and 10 to 40% by weight transitional phase alumina. Also normally present are Na2O and SiO2 derived from sodium silicate binder.

Y-faujasite is allowed to crystallize by mixing the calcined kaolin microspheres with the appropriate amounts of other constituents (including at least sodium silicate and water), as discussed in detail below, and then heating the resulting slurry to a temperature and for a time (e.g., to 200°–215° F. for 10–24 hours) sufficient to crystallize Y-faujasite in the microspheres. The prescriptions of U.S. Pat. No. 4,493,902 may be followed as written. Equivalent, reformatted recipes are provided as follows, however.

The crystallization recipes we employ are based on a set of assumptions and certain raw materials. The seeds are described by U.S. Pat. No. 4,631,262 and are preferably used externally. The SiO2, Al2O3, and Na2O components of metakaolin, seeds, sodium silicate solution, calcined sodium silicate binder, and silica gel are assumed to be 100% reactive. The alumina derived from the calcined boehmite is assumed to be completely unreactive for zeolite synthesis. The alumina and silica in kaolin calcined through the exotherm to the spinel form are assumed to be 1% and 90% reactive respectively. Although these two values are in use, they are not believed to be accurate. The alumina and silica in kaolin calcined through the exotherm to the mullite form are assumed to be 0% and 67% reactive, respectively. These two values are believed to be accurate, representing the inertness of 3:2 mullite in crystallization and the full solubility of the free silica phase. Since metakaolin alumina is the limiting reagent in the synthesis and the volume of zeolite is much larger than the corresponding volume of metakaolin, it is important to limit the zeolite iyield appropriately for a given microsphere pore volume. Otherwise, there will result little or no residual pore volume after crystallization. Such is the case for the prior art. On the other hand, if insufficient limiting reagent is available in the microsphere to grow sufficient zeolite to appropriately harden the catalyst, additional nutrient alumina may be added in the form of metakaolin microspheres, as is well known in this art. Thus, tight process control is enabled for pore volume and attrition.

Using these assumptions, the following weight ratios for reactive components are used in the overall crystallization recipes. Inert components do not enter into the ratios, except in the case of the seeds dose, which is defined as the ratio of the grams of seeds Al2O3 to total grams of microspheres.

| Weight Ratios | SiO$_2$/Na$_2$O | SiO$_2$/Al$_2$O$_3$ | H$_2$O/Na$_2$O | Seeds Al$_2$O$_3$/MS |
|---|---|---|---|---|
| Broadly | 2.50–3.1 | 4.5–15 | 5–15 | .01–0.0001 |
| Preferred | 2.55–2.95 | 5.5–8 | 5.5–8 | 0.006–0.001 |
| Typical | 2.75 | 7.0 | 7.0 | 0.004 |
| (Acid-neut.) | 2.9 | | | |

The sodium silicate and sodium hydroxide reactants may be added to the crystallization reactor from a variety of sources. For example, the reactants may be provided as an aqueous mixture of N® Brand sodium silicate and sodium hydroxide. As another example, at least part of the sodium silicate may be provided by the mother liquor produced during the crystallization of another zeolite-containing product.

After the crystallization process is terminated, the microspheres containing Y-faujasite are separated from at least a substantial portion of their mother liquor, e.g., by filtration. It may be desirable to wash to microspheres by contacting them with water either during or after the filtration step. The purpose of the washing step is to remove mother liquor that would otherwise be left entrained within the microspheres. "Silica Retention" may be practiced. The teachings of U.S. Pat. No. 4,493,902 at column 12, lines 3–31, regarding silica retention are incorporated herein by cross-reference.

After crystallization by reaction in a seeded sodium silicate solution, the microspheres contain crystalline Y-faujasite in the sodium form. In order to obtain a product having acceptable catalytic properties, it is necessary to replace sodium cations in the microspheres with more desirable cations. This may be accomplished by contacting the microspheres with solutions containing ammonium or rare earth cations or both. The ion exchange step or steps are preferably carried out so that the resulting catalyst contains less than about 0.7%, most preferably less than about 0.5% and most preferably less than about 0.4%, by weight Na$_2$O. After ion exchange, the microspheres are dried to obtain the microspheres of the present invention. In order to make 0 (zero) wt. % rare earth (REO) catalysts, the Na$^+$ cations are exchanged by using only an ammonium salt such as NH$_4$NO$_3$ and without using any rare earth salt during exchange. Such 0 (zero) wt. % REO catalysts are especially beneficial as FCC catalysts that give higher octane gasoline and more olefinic product. Rare earth versions of catalysts of this invention, post treated after crystallization by ion-exchange with high levels of rare earth, e.g., by procedures such as described in the '902 patent, are useful when exceptionally high activity is sought and the octane rating of the FCC gasoline produce is not of prime importance. Rare earth levels in the range of 0.1% to 12% usually between 0.5% and 7% (weight basis) are contemplated. Following ammonium and rare earth exchange, the catalyst is calcined at 1100°–1200° F. for 1–2 hours and unit cell size of the Y zeolite is reduced. Preferably, this calcination is done in a covered tray with 25% free moisture present.

The preferred catalyst of the invention comprises microspheres containing at least 15% and preferably from 40 to 65% by weight Y faujasite, expressed on the basis of the as-crystallized sodium faujasite form zeolite. As used herein, the term Y faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 Å as determined by the technique described in the ASTM standard method of testing titled "Determination of the Unit Cell Size Dimension of a Faujasite Type Zeolite" (Designation D3942-80) or by an equivalent technique. The term Y faujasite shall encompass the zeolite in its sodium form as well as in the known modified forms, including, e.g., rare earth and ammonium exchanged forms and stabilized forms. The percentage of Y faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

It is preferred that the Y faujasite component of the microspheres, in their sodium form, have a crystalline unit cell size of less than about 24.73 Å and most preferably less than about 24.69 Å. Typically, the Y faujasite component of the microspheres has a crystalline unit cell size range of between 24.64 to 24.73 Å, corresponding to a SiO$_2$/Al$_2$O$_3$ molar ratio of the Y faujasite of about 4.1–5.2.

Table 1 below sets forth ranges for the chemical composition and surface areas of catalysts formed in accordance with this invention.

TABLE 1

Range of surface areas and UCS for invention catalyst

| Range | Low | High |
|---|---|---|
| SiO$_2$, wt. % | 35 | 60 |
| Al$_2$O$_3$, wt. % | 30 | 60 |
| TSA, m$^2$/g | 300 | 475 |
| MSA, m$^2$/g | 60 | 120 |
| ZSA, m$^2$/g | 190 | 415 |

Conditions useful in operating FCC units utilizing catalyst of the invention are well-known in the art and are contemplated in using the catalysts of the invention. These conditions are described in numerous publications including Catal. Rev.—Sci. Eng., 18 (1), 1–150 (1978), which is incorporated herein by cross-reference. The catalysts of this invention are particularly useful in cracking residuum and resid-containing feeds having a Ni+V metals content of at least 2,000 ppm and a Conradson carbon content greater than 1.0.

The catalyst of the present invention, like all commercial fluid catalytic cracking catalysts, will be hydrothermally deactivated during the operation of the cracking unit. Accordingly, as used herein, the phrase "cracking the petroleum feedstock in the presence of a catalyst" shall include cracking the petroleum feedstock in the presence of the catalyst in its fresh, partially deactivated, or fully deactivated form.

FIG. 1 illustrates the unique morphology of the FCC catalysts of this invention achievable from the unique alumina-containing materials used to derive the catalyst matrix when zeolite is grown upon them. Again, from the discussion above, it was thought that the less porous catalyst microspheres were superior products in view of the excellent attrition resistance, high activity and selectivity provided, especially in light of the well established fact that these catalysts have selectivity at least equivalent to lower surface area, higher pore volume catalysts, and frequently better selectivity at short contact time. Assertions to the contrary would easily be dismissed as self-serving and would also be tantamount to saying the so-called incorporated catalysts were diffusion-limited at short residence time. It has only recently been discovered that under the short contact time FCC processing, FCC catalysts technologies may be diffusion limited with respect to transport in pores external to the zeolite. This is proposed to be the reason that the API gravity of the bottoms fraction has often risen after SCT revamp. Less obvious than that, it now appears that conventional, prior art catalysts fail to provide all of the potential gains of the SCT hardware. But heretofore there was no way to know what benefits were absent. Accordingly, the catalyst microspheres of this invention have a substantially different morphology than the previous catalyst microspheres, especially with respect to the increased pore volume, zeolite-on-matrix morphology, and moderate surface area. Attrition resistance of these catalysts is good and effective for the SCT FCC processing conditions.

As can be surmised from FIG. 1, the method of preparation and subsequent properties such as mercury pore volume, the catalyst of this invention includes a macroporous matrix in which the macropores of the matrix are formed from a random configuration of porous matrix planar structures which are lined with the zeolite crystals. Thus, the macropores of the catalyst are lined with the active zeolite crystals. The macroporosity of the catalyst allows the hydrocarbons to enter the catalyst freely and the increased macropore surface area thereof allows such hydrocarbons to contact the catalytic surfaces. Importantly, the hydrocarbons can contact the zeolite unobstructed, rendering the catalyst very active and selective to gasoline. While conventional incorporated zeolite catalysts, in which the zeolite crystals are incorporated within a binder and/or matrix, have a highly porous matrix, at least a portion of the binder coats or otherwise obstructs the zeolite crystals. In the present microspheroidal catalysts, there is no need for a separate physical binder which glues the zeolite to the matrix surface other than any minute amounts of silicate which may remain subsequent to zeolite crystallization. It is believed that the microsphere catalysts formed in accordance with the process of the present invention yield the highest accessibility to the zeolite of any zeolite/matrix catalyst.

Also essentially present in a highly dispersed state are the particles of metals passivating alumina. While there is a preponderance of zeolite lining the macropore walls of the invention, smaller particles presumed to be formed from the dispersed boehmite and/or mullite can also be seen in the images.

It has been found that the microspheroidal catalysts of the present invention provide high conversions via low coke selectivity and higher selectivities to gasoline relative to previous FCC catalysts presently on the market. It is surprising that this catalyst can consistently outperform conventional incorporated catalysts of similar or even higher porosity and lower surface area. This shows that having added porosity alone is not sufficient. It is now believed that the novel structured catalysts, being both macroporous and with the macropore walls lined with zeolite and with the mesoporous or microporous matrix substantially behind the zeolite layer are the reasons the catalyst excels at gasoline, LCO and coke selectivity. The present catalyst is sufficient to crack the heavier hydrocarbons and anticipated to improve the API gravity of the bottom fraction, especially during the short contact time processing.

The examples, which follow, illustrate the present invention:

EXAMPLES 1 AND 2

Microspheres containing boehmite were prepared according to the general method described in Example 1 of copending, commonly assigned U.S. Ser. No. 09/978,180, filed Oct. 17, 2001. Dry M93 (an ultrafine hydrous kaolin pulverized and calcined through the exotherm to small crystallite size mullite) was added to a slurry of hydrous kaolin, and then sodium silicate (3.22 $SiO_2/Na_2O$) was added to the kaolin slurry in a Cowles mixer. Enough water was added to keep the mixture fluid enough to atomize at high shear in the spray dryer, in spite of the dilatant nature of the M93 and the tendency of the silicate to floc the hydrous kaolin component. The boehmite alumina, reported in Table 2 as Nabaltec AOH, a boehmite as received, was separately peptized and combined with the kaolin-silicate mixture with an in-line mixer just before a wheel-type atomizer. Table 2 sets forth the compositions and apparent bulk density of the microspheres formed.

TABLE 2

| Example | 1 | 2 |
|---|---|---|
| M93[1] | 38.5% | 45% |
| DMF hydrous kaolin[2] | 38.5% | 35% |
| Nabaltec AOH[3] | 23% | 20% |
| SiO2 binder[4] | 15% | 15% |
| ABD, g/cc | 0.64 | 0.60 |

[1]Engelhard Corporation, USA. Typical ISP solids of 48–52% and integrated X-ray line intensity about 60–70% of fully matured mullite from kaolin.
[2]Engelhard Corporation, USA. Typically 70% < 2 um by sedimentation hydrous kaolin.
[3]Nabaltec
[4]N-brand ® 3.22 modulus sodium silicate from PQ Corporation, USA.

The microspheres were calcined directly at 1500° F. for 2.5 hours before further use.

EXAMPLE 3

Two reactors of identical composition were run to grow zeolite in the microsphere of Example 1. The formulation is set forth in Table 3.

TABLE 3

| Microsphere | Example 1 |
|---|---|
| Grams microsphere | 612 |
| Grams seeds[1] | 538 |
| Grams N-brand[2] | 1367 |
| Grams 50% caustic | 175 |
| Grams water | 552 |

[1](US 4,631,262). Actual composition was $Na_2O$ = 12.1 Wt %, $SiO_2$ = 24.5 Wt %, $Al_2O_3$ = 0.5 Wt %.
[2]PQ Corporation, $SiO_2/Na_2O$ = 3.22 w/w.

The corresponding ratios of the crystallization mixture were $SiO_2/Na_2O$=2.90 w/w, $H_2O/Na_2O$=6.50 w/w, $SiO_2/Al_2O_3$=5.5 w/w and seeds $Al_2O_3$/grams microspheres of 0.0044 w/w. These ratios are based on the assumptions described above and with the calcined boehmite assumed inert during crystallizations.

After 20 hours of crystallization, the two reactors contained about 40% zeolite Y by X-ray. The crystallizations were terminated and the combined crystallization products were ion exchanged by conventional methods, such as the alternating ammonium and rare earth ion exchanges described in Example 1 of U.S. Ser. No. 09/978,180.

Properties of the rare earth exchanged and calcined catalyst of Example 3 at various stages of preparation are shown in Table 4.

TABLE 4

|  | TSA m2/g | MSA m2/g | Na2O Wt % | REO Wt % | SiO2 Wt % | Al2O3 Wt % | UCS A | ZI Wt % | Roller Wt %/hr | HgTPV Cc/gm |
|---|---|---|---|---|---|---|---|---|---|---|
| Sodium Form | 452 | 60 | 8062 | — | 46.9 | 42.3 | 24.62 | 54 | | |
| 1st Calcination | 401 | 69 | 2.01 | 3.48 | | | 24.65 | | | |
| Finished product | 379 | 68 | 0.44 | 2.97 | 49.99 | 44.2 | 24.54 | | 12 | 0.39 |

The physical and chemical properties of the finished catalyst are excellent for commercial FCC operations. An SEM of this catalyst after steam treatment is shown in FIG. 1. The microspheres were cut open to expose the interior surfaces. These were found to be porous and contain a preponderance of exposed zeolite crystallites. Less predominant yet apparently effective are the matrix particles of M93 residue (small crystallite size mullite) and the dispersed alumina.

EXAMPLE 4

This example illustrates the use of acid-neutralization to reduce finished product sodium and the addition of a second microsphere containing reactive alumina to control zeolite yield, pore volume, and attrition resistance.

A second larger preparation of microspheres was done in a pilot plant with a rotary atomizer. An effort was made to substantially reproduce Example 1. Table 5 sets forth the formulation of the microsphere.

TABLE 5

| Microsphere | Example 4 |
|---|---|
| DME Hydrous | 38.5% |
| M93 | 38.5% |
| Nabaltec AOH 180DS | 23.0% |
| Binder (N-brand) | 15.0% |
| Na2O, Wt % | 4.57 |
| ABD, gms/cc | 0.62 |

Acid-neutralization was done by re-slurrying the spray-dried product in water while co-feeding diluted H2SO4 in water. The neutralized microspheres were then filtered and washed. After calcinations at 1500° F./2.5 h, the properties were as set forth in Table 6.

TABLE 6

| Microsphere ID | Example 4 |
|---|---|
| Na2O | 0.21 Wt % |
| SiO2 | 50.1 Wt % |
| Al2O3 | 47.4 Wt % |
| ABD (vf) | 0.54 g/cc |
| Hg TPV (40–20,000 Å) | 0.555 cc/g |

EXAMPLES 5–7

The microsphere product of Example 4 was then crystallized in the absence or presence of two different doses of a substantially pure metakaolin microsphere (MS2). The results of crystallization are shown in Table 7. These results showed that attrition resistance and pore volume can be controlled by adding various amounts of the second microsphere.

TABLE 7

| Example | 5 | 6 | 7 |
|---|---|---|---|
| MS2 Dose Added | 0% | 5% | 10% |
| Seeds (g) | 137.5 | 137.5 | 137.5 |
| N Brand (g) | 521 | 602 | 649 |
| 50% NaOH (g) | 83 | 81.7 | 89.6 |
| Water (g) | 163 | 157 | 169 |
| Microspheres (g)-Ex. 4 | 200 | 191.3 | 182 |
| MS2 (g) | 0 | 8.7 | 17.6 |
| Quenched, hr | 20 | 21 | 21.5 |
| ZI, Wt % | 53 | 52 | 65 (?) |
| TSA, m2/g | | 461 | 497 |
| MSA, m2/g | | 66 | 64 |
| ZSA, m2/g | | 395 | 433 |
| UCS (Angstroms) | | 24.62 | 24.64 |
| Hg TPV, cc/gm | 0.355 | 0.368 | 0.291 |
| Roller, Wt %/hr | 71 | 53 | 18 |
| ABD, gms/cc (as is) | 0.66 | 0.71 | 0.73 |

FIG. 2 compares the pore volume distribution of the catalyst of Example 7 with the pore volume distribution of a typical prior art in-situ catalyst of U.S. Pat. No. 5,395,809 and that of patent application, U.S. Ser. No. 09/956,250. The macroporous structure of the inventive catalyst can be seen.

EXAMPLES 8–11

The following examples compare the performance of the catalyst of the present invention (Example 3) against three comparative examples. The three comparative examples have all been used with success commercially with resid feeds. (Example 11 contains some ZSM5, which led to a shift in gasoline to LPG. Without the ZSM5, this sample is expected to have performed similarly to Examples 9 and 10.) The samples were laboratory deactivated in a pre-steam, fluid bed cracked on Nickel and Vanadium, post steam deactivation aprotocol. Typically Ni and V loadings were 2810 ppm and 3600 ppm respectively. The pseudo-equilibrium catalysts were then tested in an ACE microscale fluid bed at 8 WHSV, 2,125" injector, and 998° F. crack temperature with an aromatic residuum feed having a Conradson carbon residue of about 5.51%. These conditions have repeatedly correlated well with riser yield deltas between catalysts at short contact time. Table 8 sets forth the results of cracking.

TABLE 8

| Example | 8 Invention (Ex. 3) | 9 Comparative 1 | 10 Comparative 2 | 11 Comparative 3 |
|---|---|---|---|---|
| Catalyst | | | | |
| Conversion | 75.00 | 72.43 | 71.88 | 72.75 |
| H2 | 0.74 | 0.79 | 0.64 | 0.48 |
| Total C2- | 2.92 | 3.18 | 3.08 | 2.98 |
| LPG | 13.63 | 13.97 | 14.03 | 18.54 |
| Gasoline | 47.02 | 43.86 | 43.35 | 39.80 |
| LCO | 16.14 | 16.77 | 16.54 | 15.14 |
| HCO | 8.85 | 10.80 | 11.58 | 12.11 |
| Coke | 11.42 | 11.42 | 11.42 | 11.42 |
| Total | 100.00 | 100.00 | 100.00 | 100.00 |

The results demonstrate greatly improved gasoline yield and bottoms cracking for the catalyst of the invention under constraint of heat balance of the refinery. The same data sets correlated to constant conversion show dramatically improved gasoline and LCO, in addition to lower coke. The improved coke selectivity is believed to be due to improved contaminant coke from the dispersed boehmite residue, and improved catalytic coke from the increased porosity and novel zeolite on matrix structure.

EXAMPLES 12–15

These examples also compared the performance of the inventive catalyst versus comparative catalysts of related technologies.

Samples were prepared by impregnating with 3000 ppm Ni and 3000 ppm V according to the following method. In order to note behavior with Ni and V, all catalysts were first steamed at 1350° F. for 2 hours in 100% flowing steam. Then 3000 ppm Ni and 3000 ppm V were added as naphthanate or oleate solutions in cyclohexane via the Mitchell method. The organic compounds were burned away, and the metal-containing catalysts were steamed again at 1450° F. for 4 hours in a flowing mixture of 90% steam and 10% air.

Samples were tested in an ACE fluid bed after blending at various ratios with inert, metals-free kaolin microspheres to adjust conversion. The WHSV based on the total solids in the reactor was 14, the injector position was 1.125' and the cracking temperature was 970° F. The oil feed was the same resid used in examples 8–11. A post-audit of this procedure has shown that this method does not emulate short contact time severity effects, at least for gas oil feed. Surprisingly, the results of the catalyst of the invention are much better in spite of the lower severity of the test. The compositions are shown in Table 9 and the results of cracking are shown in Table 10.

TABLE 9

| Example | 12 | 13 | 14 | 15 |
|---|---|---|---|---|
| Sample | US 5,395,809 | U.S. Ser. No. 09/956,250 | U.S. Ser. No. 09/978.180 | Example 3 |
| M93 Wt % | 0 | 63 | 0 | 37 |
| Spinel Wt % | 30 | 0 | 10 | 0 |
| AOH Wt % | 0 | 0 | 23 | 23 |
| HgTPV, cc/gm | 0.13 | 0.33 | 0.08 | 0.39 |

TABLE 10

| | Cracked product yields[1] | | | |
|---|---|---|---|---|
| Example | 12 | 13 | 14 | 15 |
| Conversion | 60.43 | 60.68 | 65.84 | 70.00 |
| H2 | 0.46 | 0.59 | 0.49 | 0.53 |
| Total C2- | 2.07 | 2.10 | 2.20 | 2.13 |
| LPG | 8.82 | 9.03 | 11.58 | 12.42 |
| Gasoline | 38.36 | 38.37 | 40.88 | 44.27 |
| LCO | 20.09 | 20.56 | 18.00 | 18.44 |
| HCO | 19.48 | 18.76 | 16.15 | 11.56 |
| Coke | 11.19 | 11.19 | 11.19 | 11.19 |
| Total | 100.00 | 100.00 | 100.00 | 100.00 |
| C3=/Total C3s | 0.88 | 0.89 | 0.88 | 0.89 |

[1]Table of results correlated to constant coke yield

The results show a dramatic improvement in conversion and bottoms cracking performance under constraint of heat balance of the refinery. Results alternatively correlated to constant conversion also show dramatically improved gasoline and bottoms upgrading results. That the Wt % H2 on catalyst of the invention is not improved over the prior art in Table 10 is an artifact of the low coke selectively, and more specifically, the resulting higher active catalyst/oil ratio. While the solids/oil ratio is constant in the test, catalysts with lower coke selectivity will require more active catalyst in the blend to reach coke yield of the comparison. This increase in active catalyst/oil ratio or actives space time increases both conversion and hydrogen yield. At constant active cat/oil ratio or actives space time, the hydrogen yield on Examples 14 and 15 is 30% lower then the prior art without dispersed boehmite alumina, Examples 12 and 13. This confirms that the metals are passivated, which together with the novel structure of the catalyst, leads to the noted improvement in performance.

We claim:

1. A zeolitic fluid catalytic cracking catalyst which passivates nickel and vanadium during catalytic cracking comprising:
   (a) at least about 15% by weight Y-faujasite crystallized in-situ from a metakaolin-containing calcined microsphere; and
   (b) an alumina-containing matrix obtained by the calcination of a dispersible boehmite and a kaolin calcined through the characteristic exotherm, said calcined kaolin being derived from a pulverized, ultrafine kaolin where in 90 wt % of said ultrafine kaolin is in particles having a diameter of less than 2 microns contained in said microsphere.

2. The fluid catalytic cracking catalyst of claim 1, wherein said alumina obtained by the calcination of said dispersible boehmite comprises a transitional gamma phase.

3. The fluid catalytic cracking catalyst of claim 1, wherein said alumina obtained by the calcination of said dispersible boehmite comprises a combination of transitional gamma and delta phases.

4. The fluid catalytic cracking catalyst of claim 1, wherein said dispersible boehmite is characterized by having at least 90% of said boehmite disperse into particles less than about 1 micron in an acidic media of pH less than about 3.5.

5. The fluid catalytic cracking catalyst of claim 1, wherein said kaolin has been calcined through its characteristic exotherm with or without formation of mullite.

6. The fluid catalytic cracking catalyst of claim 5, wherein said kaolin calcined through its characteristic exotherm is spinel.

7. The fluid catalytic cracking catalyst of claim 5, wherein said kaolin calcined through its characteristic exotherm comprises mullite.

8. The fluid catalytic cracking catalyst of claim 7 wherein said kaolin calcined through its characteristic exotherm has 20–80% of the integrated X-ray diffraction peak areas of fully crystallized mullite.

9. The fluid catalytic cracking catalyst of claim 5, wherein said kaolin calcined through its characteristic exotherm comprises both spinel and mullite.

10. The fluid catalytic cracking catalyst of claim 1, wherein said Y-faujasite comprises at least about 40% by weight of said catalyst.

11. The fluid catalytic cracking catalyst of claim 1, wherein said Y-faujasite is ion-exchanged to reduce the sodium content of said catalyst to less than 0.7% by weight $Na_2O$.

12. The fluid catalytic cracking catalyst of claim 1, wherein said Y-faujasite is ion-exchanged to reduce the sodium content of said catalyst to less than 0.5% by weight $Na_2O$.

13. The fluid catalytic cracking catalyst of claim 1, wherein said Y-faujasite is the product of ammonium exchange.

14. The fluid catalytic cracking catalyst of claim 1, wherein said Y-faujasite is exchanged with rare earth cations to provide a rare earth level as REO of 0.1 to 12 wt. %.

15. The fluid catalytic cracking catalyst of claim 1, comprising rare earth levels, expressed as rare earth oxide, REO of 0.5 to 9 wt. %.

16. The fluid catalytic cracking catalyst of claim 5, wherein said calcined microspheres comprise 30 to 60% by weight metakaolin, 25–60% by weight kaolin calcined through its characteristic exotherm and 10–40% by weight of said alumina obtained by the calcination of dispersible boehmite.

17. The fluid catalytic cracking catalyst of claim 16, wherein said alumina obtained by the calcination of dispersible boehmite comprises a transitional gamma phase.

18. The fluid catalytic cracking catalyst of claim 16, wherein said alumina obtained by the calcination of dispersible boehmite comprises a combination of transitional gamma and delta phases.

19. The fluid catalytic cracking catalyst of claim 17, wherein said dispersible boehmite is characterized by having at least 90% of said boehmite disperse into particles less than about 1 micron in an acidic media of pH less than about 3.5.

20. The fluid catalytic cracking catalyst of claim 1 having a mercury porosity of greater than about 0.15 cc/g for pores having diameters in the range of 40–20,000 Å.

21. The fluid catalytic cracking catalyst of claim 20, wherein 90% of said ultrafine kaolin is in particles having a diameter of less than 1 micron.

22. The fluid catalytic cracking catalyst of claim 20, having a mercury porosity of at least about 0.25 cc/g for pores having diameters in the range of 40–20,000 Å.

23. The fluid catalytic cracking catalyst of claim 20, wherein said kaolin is a gray kaolin containing at least about 0.6 wt. % iron oxide.

24. The fluid catalytic cracking catalyst of claim 20, wherein said kaolin calcined through its characteristic exotherm has an incipient slurry point of less than 57% solids.

25. The fluid catalytic cracking catalyst of claim 24, wherein said kaolin calcined through its characteristic exotherm has incipient slurry point of no greater than 52% solids.

26. The fluid catalytic cracking catalyst of claim 20 wherein said alumina containing matrix is further derived in part from a coarse alumina source having an incipient slurry point of greater than 57%.

27. The fluid catalytic cracking catalyst of claim 20 having a mercury porosity of at least 0.07 cc/gm for pores of 600–20,000 Å diameter.

28. The fluid catalytic cracking catalyst of claim 20 having a mercury porosity of at least 0.10 cc/gm for pores of 600–20,000 Å diameter.

29. The fluid catalytic cracking catalyst of claim 20 having a BET surface area of less than 500 $m^2/g$.

30. The fluid catalytic cracking catalyst of claim 20 having a BET surface area less than 475 $m^2/g$.

31. The fluid catalytic cracking catalyst of claim 20 having a BET surface area in the range of about 300–450 $m^2/g$.

32. A fluid catalytic cracking catalyst comprising microspheres containing in-situ crystallized Y-faujasite, and having a mercury porosity of greater than about 0.15 cc/g for pores having diameters in the range of 40–20,000 Å, said microspheres comprising:

a non-zeolitic, alumina matrix comprising a calcined dispersible boehmite.

33. The fluid catalytic cracking catalyst of claim 32 wherein said alumina matrix comprises a first alumina of calcined dispersible boehmite and a second alumina from a calcined matrix precursor having an incipient slurry point of less than 57% solids.

34. The fluid catalytic cracking catalyst of claim 33, wherein said calcined matrix precursor has an incipient slurry point of no more than 52% solids.

35. The fluid catalytic cracking catalyst of claim 33, wherein said calcined alumina is derived from delaminated kaolin which has been pulverized and calcined.

36. The fluid catalytic cracking catalyst of claim 32 having a mercury porosity of greater than 0.30 cc/g for pores having diameters in the range of 40–20,000 Å.

37. The fluid catalytic cracking catalyst of claim 33, wherein said calcined matrix precursor is kaolin that has been calcined through its characteristic exotherm with or without the formation of mullite.

38. The fluid catalytic cracking catalyst of claim 37, wherein said kaolin calcined through its exotherm has 20 to 80% of the integrated X-ray diffraction peak areas of fully crystallized mullite.

39. The fluid catalytic cracking catalyst of claim 32 containing 0–12 wt. % rare earth oxides.

40. The fluid catalytic cracking catalyst of claim 39 containing 0.5–9 wt. % rare earth oxide.

41. The fluid catalytic cracking catalyst of claim 32 having a mercury porosity of at least 0.07 cc/gm for pores of 600–20,000 Å diameter.

42. The fluid catalytic cracking catalyst of claim 41 having a mercury porosity of at least 0.10 cc/gm for pores of 600–20,000 Å diameter.

43. The fluid catalytic cracking catalyst of claim 32 having a BET surface area of less than 500 $m^2/g$.

44. The fluid catalytic cracking catalyst of claim 32 having a BET surface area less than 475 $m^2/g$.

45. The fluid catalytic cracking catalyst of claim 32 having a BET surface area in the range of about 300–450 $m^2/g$.

46. The fluid catalytic cracking catalyst of claim 32, wherein said calcined dispersible boehmite comprises a transitional gamma phase.

47. The fluid catalytic cracking catalyst of claim 32, wherein said calcined dispersible boehmite comprises a combination of transitional gamma and delta phases.

48. The fluid catalytic cracking catalyst of claim 32, wherein said dispersible boehmite is characterized by having at least 90% of said boehmite disperse into particles less than about 1 micron in an acidic media of pH less than about 3.5.

49. A macroporous, zeolite FCC catalyst which passivates metal contaminants comprising zeolite crystallized as a layer on the surface of a porous alumina-containing matrix, said zeolite-layered matrix arranged in a configuration to provide macropores in which the zeolite layer is provided on the walls of the macropores, said alumina-containing matrix comprising a calcined dispersible boehmite.

50. The catalyst of claim 49, wherein the matrix is further derived from a kaolin calcined through the exotherm.

51. The catalyst of claim 50, wherein said kaolin calcined through the exotherm does not contain mullite.

52. The catalyst of claim 50, wherein said kaolin calcined through the exotherm contains mullite.

53. The catalyst of claim 49, wherein said crystallized zeolite is zeolite Y.

54. The catalyst of claim 49 having a mercury porosity of greater than 0.15 cc/gm for pores of 40–20,000 Å diameter.

55. The catalyst of claim 49 having a mercury porosity of at least 0.30 cc/gm for pores of 40–20,000 Å diameter.

56. The catalyst of claim 49 wherein said zeolite is crystallized in-situ on the surface of said matrix.

57. The catalyst of claim 49 which is substantially free of an added binder.

58. The catalyst of claim 52 wherein said matrix comprises 20–80% of the integrated X-ray diffraction peak areas of fully crystalline mullite.

59. The catalyst of claim 49 having a mercury porosity of at least 0.07 cc/gm for pores of 600–20,000 Å diameter.

60. The catalyst of claim 58 having a mercury porosity of at least 0.07 cc/gm for pores of 600–20,000 Å diameter.

61. The catalyst of claim 49 having a mercury porosity of at least 0.10 cc/gm for pores of 600–20,000 Å diameter.

62. The catalyst of claim 49 having a BET surface area of less than 500 $m^2/g$.

63. The catalyst of claim 49 having a BET surface area of less than 475 $m^2/g$.

64. The catalyst of claim 49 having a BET surface area of between about 300–450 $m^2/g$.

65. The catalyst of claim 49, wherein said alumina obtained by the calcination of said dispersible boehmite comprises a transitional gamma phase.

66. The catalyst of claim 49, wherein said alumina obtained by the calcination of said dispersible boehmite comprises a combination of transitional gamma and delta phases.

67. The catalyst of claim 49, wherein said dispersible boehmite is characterized by having at least 90% of said boehmite disperse into particles less than about 1 micron in an acidic media of pH less than about 3.5.

68. A method of cracking a hydrocarbon feed under FCC conditions, comprising contacting said hydrocarbon feed with the catalyst of claims 1, 32, or 49.

69. The method of claim 68, wherein said hydrocarbon feed and catalyst are contacted for a time of no more than 3 seconds.

70. The method of claim 68, wherein said catalyst and said hydrocarbon feed are contacted for a time of no more than 1 second.

71. The method of claim 68, wherein said catalyst has a mercury porosity of at least 0.15 cc/g for pores of 40–20,000 Å diameter.

72. The method of claim 68, wherein said catalyst has a mercury porosity of at least 0.07 cc/gm for pores having a size of 600–20,000 Å in diameter.

73. The method of claim 68, wherein said catalyst has a mercury porosity of at least 0.10 cc/gm for pores having a size of 600–20,000 Å in diameter.

74. The method of claim 68, wherein said catalyst has a BET surface area of less than 500 $m^2/g$.

75. The method of claim 68, wherein said catalyst has a BET surface area of less than 475 $m^2/g$.

76. The method of claim 68, wherein said catalyst has a BET surface area of between 300–475 $m^2/g$.

77. The method of claim 69, wherein said catalyst has a BET surface area of less than 500 $m^2/g$.

78. The method of claim 68, wherein said catalyst comprises 0.5 to 9 wt. % REO.

79. The method of claim 68 wherein said hydrocarbon feed is a resid containing at least 2000 ppm of Ni and V metals.

80. The method of claim 79, wherein said hydrocarbon feed and catalyst are contacted for a time of no more than 3 seconds.

* * * * *